(12) United States Patent
Maus et al.

(10) Patent No.: US 9,091,196 B2
(45) Date of Patent: Jul. 28, 2015

(54) METALLIC HONEYCOMB BODY WITH DEFINED CONNECTING POINTS AND MOTOR VEHICLE HAVING THE HONEYCOMB BODY

(75) Inventors: Wolfgang Maus, Bergisch Gladbach (DE); Rolf Brück, Bergisch Gladbach (DE); Peter Hirth, Rösrath (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 225 days.

(21) Appl. No.: 12/955,265

(22) Filed: Nov. 29, 2010

(65) Prior Publication Data

US 2011/0120069 A1 May 26, 2011

Related U.S. Application Data

(63) Continuation of application No. PCT/EP2009/055680, filed on May 11, 2009.

(30) Foreign Application Priority Data

May 28, 2008 (DE) .................. 10 2008 025 593

(51) Int. Cl.
*B01D 46/10* (2006.01)
*F01N 3/28* (2006.01)

(52) U.S. Cl.
CPC ............. *F01N 3/281* (2013.01); *F01N 2260/10* (2013.01); *F01N 2330/04* (2013.01); *F01N 2330/321* (2013.01); *F01N 2330/325* (2013.01); *F01N 2330/44* (2013.01); *F01N 2330/48* (2013.01); *Y10T 428/1234* (2015.01)

(58) Field of Classification Search
CPC ............. F01N 3/021–3/0228; F01N 2330/44; F01N 2330/48; F01N 2330/325
USPC ............... 55/523, 525, 521; 60/311; 422/177; 428/593
See application file for complete search history.

(56) References Cited

U.S. PATENT DOCUMENTS

| 5,328,774 | A | * | 7/1994 | Maus et al. .................. 428/593 |
| 5,403,559 | A | * | 4/1995 | Swars .......................... 422/180 |
| 5,620,666 | A | * | 4/1997 | Usui ............................ 422/171 |
| 5,865,864 | A | * | 2/1999 | Bruck ............................ 55/482 |
| 6,057,263 | A | * | 5/2000 | Takahashi et al. ............ 502/439 |
| 6,060,173 | A | * | 5/2000 | Retallick ...................... 428/593 |
| 6,217,832 | B1 | * | 4/2001 | Betta et al. ................... 422/179 |
| 7,318,276 | B2 | * | 1/2008 | Bruck et al. ............. 29/890.039 |
| 2005/0186127 | A1 | * | 8/2005 | Reck et al. ................... 422/180 |
| 2006/0107659 | A1 | * | 5/2006 | Hodgson ........................ 60/299 |
| 2008/0083214 | A1 | * | 4/2008 | Kramer et al. ................. 60/311 |
| 2011/0033344 | A1 | * | 2/2011 | Bruck et al. .................. 422/177 |
| 2011/0104016 | A1 | * | 5/2011 | Bruck et al. .................. 422/177 |

FOREIGN PATENT DOCUMENTS

| DE | 33 12 944 A1 | 10/1984 |
| JP | 04148016 A | 5/1992 |
| JP | 08141409 A | 6/1996 |
| JP | 10180043 A | 7/1998 |
| JP | 11500205 A | 1/1999 |

OTHER PUBLICATIONS

International Search Report of PCT/EP2009/055680, Dated Aug. 17, 2009.

* cited by examiner

*Primary Examiner* — Thomas McKenzie
(74) *Attorney, Agent, or Firm* — Laurence A. Greenberg; Werner H. Stemer; Ralph E. Locher

(57) ABSTRACT

A honeycomb body includes at least a housing and a honeycomb structure with a multiplicity of channels. The honeycomb structure includes at least one at least partially structured metallic layer forming connecting points which fix the honeycomb structure. A cross section of the honeycomb structure has radial zones with connecting points. At least 1% and at most 20% of inner contact points of the at least one at least partially structured metallic layer in at least one of the zones forms a connecting point in the cross section. The channels have a different channel cross section in at least two of the radial zones. A motor vehicle having the honeycomb body is also provided.

12 Claims, 5 Drawing Sheets

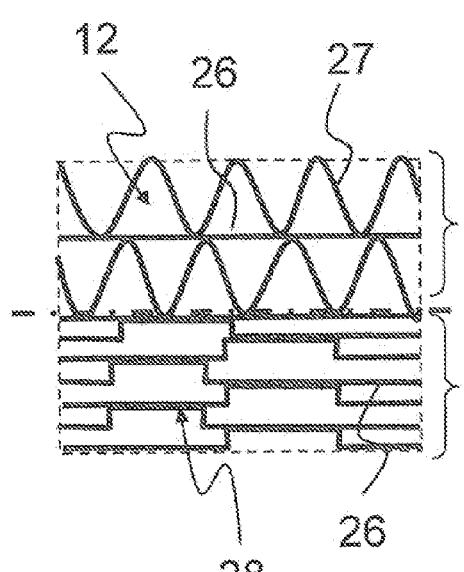
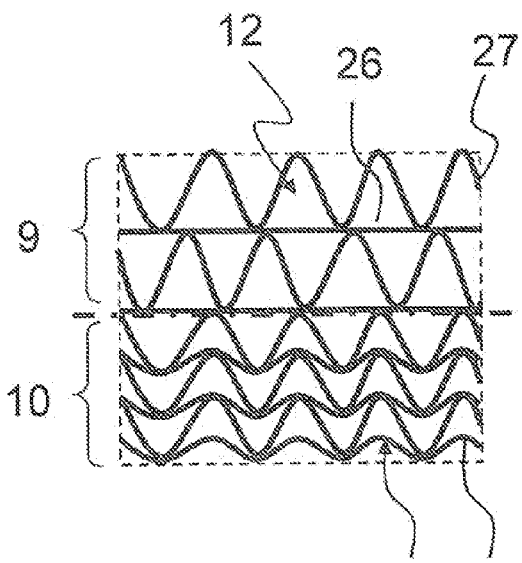
FIG. 4   FIG. 5
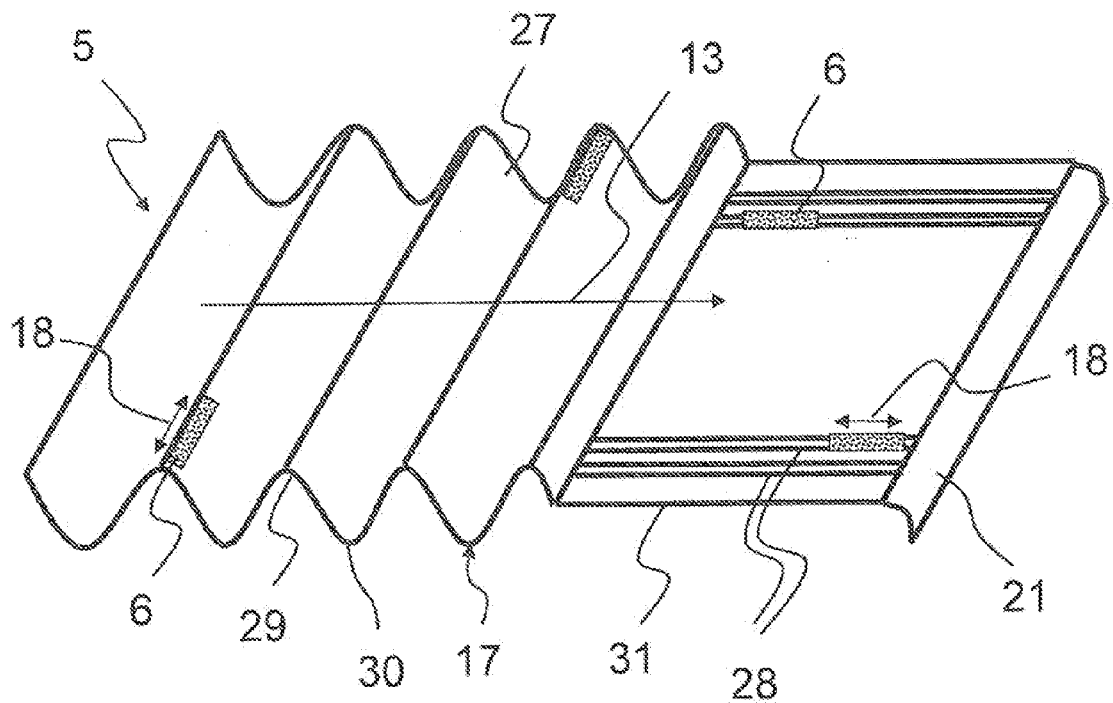
FIG. 6

METALLIC HONEYCOMB BODY WITH DEFINED CONNECTING POINTS AND MOTOR VEHICLE HAVING THE HONEYCOMB BODY

CROSS-REFERENCE TO RELATED APPLICATION

This is a continuation, under 35 U.S.C. §120, of copending International Application No. PCT/EP2009/055680, filed May 11, 2009, which designated the U.S.; this application also claims the priority, under 35 U.S.C. §119, of German Patent Application DE 10 2008 025 593.9, filed May 28, 2008; the prior applications are herewith incorporated by reference in their entirety.

BACKGROUND OF THE INVENTION

Field of the Invention

The present invention relates to a honeycomb body at least including a housing and a honeycomb structure having a multiplicity of channels. The honeycomb structure is formed with at least one at least partially structured metallic layer which forms connecting points fixing the honeycomb structure. A cross section of the honeycomb structure has radial zones with connecting points. At least 1% and at most 20% of inner contact points of the at least one at least partially structured metallic layer in the cross section in at least one of the radial zones form a connecting point. Such a honeycomb body is used, in particular, as an exhaust-gas treatment unit in exhaust systems of mobile internal combustion engines. The invention also relates to a motor vehicle having the honeycomb body.

Such honeycomb bodies are usually composed of a one-part or multi-part housing which is provided with a relatively large material thickness, in such a way that it can form an outer shape or structure and/or even a part of the exhaust line itself. In contrast, there is a tendency to form the metal foils for constructing the honeycomb structure to be relatively thin-walled in order to realize as large a surface area as possible in the same installation space. The surface is utilized, for example, for the application of catalysts which come into contact with the exhaust gas flowing through the honeycomb structure. Intensive contact of exhaust-gas constituents with the catalyst, and therefore effective purification of the exhaust gas, are therefore ensured.

It is a problem in that case that the thin metal foils behave differently than the relatively thick-walled housing under alternating thermal and/or dynamic loading, such as is conventional in a mobile exhaust system. Therefore, the connection between the housing and the metal foils poses a particular technical challenge.

It is known to apply strips of brazing material, for example so-called brazing foils, to the inner lateral surface of a housing of such a honeycomb body before the integration of the metal foils or the honeycomb structure, and to then insert the honeycomb structure. It is likewise known to wrap such a brazing foil around the honeycomb structure and to then insert the assembly into the housing, in such a way that the entire brazing foil bears against the inner lateral surface of the housing. The same process has already been proposed, with the brazing regions being provided not as a strip over the entire circumference but rather through the use of relatively large, mutually offset patches. A similar large-area, patch-like provision of brazing material on an end side or in partial volumes of the honeycomb structure has also already been proposed.

The aim of such a "selective" brazing is, in particular, to create zones in the honeycomb structure or in the connecting region between the honeycomb structure and the housing, which are not rigidly connected to one another and can therefore compensate for different expansions and the like by virtue of the individual components being displaced relative to one another. Even though adequate durability of the honeycomb bodies can be realized for some applications by using that strategy, damage can sometimes occur in that case, specifically in highly loaded parts.

SUMMARY OF THE INVENTION

It is accordingly an object of the invention to provide a metallic honeycomb body with defined connecting points and a motor vehicle having the honeycomb body, which overcome the hereinafore-mentioned disadvantages and at least partially solve the highlighted problems of the heretofore-known devices of this general type. In this case, it is sought, in particular, to specify a honeycomb body which, even in an application where it is subjected to high loading, has defined and stable behavior with regard to alternating thermal and/or dynamic loading and therefore permits a long service life.

With the foregoing and other objects in view there is provided, in accordance with the invention, a honeycomb body, comprising a housing and a honeycomb structure having a cross section with radial zones and at least one at least partially structured metallic layer. The at least one at least partially structured metallic layer has inner contact points and defines a multiplicity of channels. At least 1% and at most 20% of the inner contact points in the cross section in at least one of the radial zones forms a respective connecting point fixing the honeycomb structure. The channels have different channel cross sections in at least two of the radial zones.

In this case, the housing is preferably formed in one piece and may have a cylindrical cross-sectional shape or some other cross-sectional shape. With regard to the number of channels, it is preferable for the honeycomb body to be formed with a channel density measured in cells per square inch (cpsi) in a range of from 100 to 1000, in particular from 200 to 600. It is also preferable for a plurality of smooth and a plurality of structured (for example corrugated) metallic layers (for example in the form of sheet-metal foils) to be used to produce the honeycomb body. Even though such metallic layers may, for example, be wound in spiral fashion, it is however preferable in this case for the metallic layer to have a profile differing therefrom, for example S-shaped, V-shaped, W-shaped, U-shaped or the like. Such metallic layers are then disposed relative to one another in such a way that they ultimately uniformly fill out the (round, oval or similar) cross section of the honeycomb body. The metallic layers are connected to one another (in a force-locking and/or form-locking fashion) at various points or locations, which are so-called connecting points. The connecting points preferably involve a brazed connection, in particular a high-temperature vacuum brazed connection. Through the use of the connecting points, the relative position of the metallic layers with respect to one another is thus defined in a punctiform manner in such a way that the honeycomb structure is substantially fixed with respect to one another and in the housing. A force-locking connection is one which connects two elements together by force external to the elements, as opposed to a form-locking connection which is provided by the shapes of the elements themselves.

The honeycomb body may be divided into a plurality of radial zones, in which connecting points are formed only to a very limited extent at least in one radial zone. For example, a multiplicity of inner contact points of the at least one metallic layer are formed in the radial zone (for example in the shape of a central ring or a circular ring). The contact points are usually formed by virtue of a section of a structured metallic layer bearing against another section of an adjacent metallic layer (smooth and/or structured). The contact points are generally contact lines, which run in the direction of a structure, of the adjacent sections of metallic layers. In the at least one zone, at most 20% of the contact points are utilized to form the connecting points which fix the honeycomb structure and which are disposed in a distributed fashion. No connecting points are formed at the other contact points (at least in the cross section being considered). In this case, the proportion of connecting points is preferably less than 10% or even less than 5% of the contact points.

Furthermore, it is also proposed herein that channels with a different channel cross section be formed in at least two radial zones. It is very particularly preferable in this case for, in particular, that zone which is disposed close to the housing to have a different cross section. The changed shape of the channel cross section achieves, in particular, a modification of the structures of the inner contact points or of the contact points of the metallic layer with the housing. This takes place, in particular, with the aim of creating contact points in this case which are beneficial for a durable and defined selective formation of the connecting points. In this respect, the invention is released from the notion that the connecting points can be formed only at the "conventional" contact points, because it now also proposes that the honeycomb structure be constructed by using a construction criterion which is not influenced primarily by the interaction of the honeycomb structure-exhaust gas contact and/or pressure loss.

Merely for the sake of completeness, it is pointed out that this does not mean random "deformations" of the metallic layer, but rather it means that a channel cross section which is representative of the entire radial zone is taken as a starting point. In particular, the boundaries to the adjacent radial zones are significant, strictly separated and/or clearly identifiable.

In accordance with another feature of the invention, it is considered to be advantageous for a higher density of inner contact points to be provided per unit of cross-sectional area of the honeycomb structure in one radial zone than in at least one other radial zone. Such a "unit of cross-sectional area" refers to an imaginary region of the honeycomb structure which is large enough to encompass a representative channel cross-sectional shape for the respective radial zone. In this case, the unit of cross-sectional area of the honeycomb structure includes, for example, at least 20 channels, at least 50 channels or even at least 100 channels. If consideration is now given to the same unit of cross-sectional area in another radial zone, then it is possible in this case for more or fewer inner contact points between the adjacent sections of the at least one at least partially structured metallic layer to be identified. The density or number of inner contact points per unit of cross-sectional area thus expresses that more or fewer options are available for the formation of a fixing connecting point. In this way, it is possible in this case to predefine specially distributed punctiform brazing patterns for the defined formation of the connecting points. The density of the contact points per unit of cross-sectional area can be influenced, in particular, through the use of the specification of the structure of the metallic layer, that is to say, for example, the height and/or width of the latter. It is also possible for additional components to be inserted and/or for contact points to be widened. Different densities/numbers of connecting points are nevertheless formed per unit of cross-sectional area, or vice versa with the same demand for the formation of connecting points.

In accordance with a further feature of the invention, it is also considered to be advantageous for a density of the connecting points as viewed along the at least one metallic layer to be higher in one radial zone than in at least one other radial zone. As already stated above, after the formation of a honeycomb structure, the at least one at least partially structured metallic layer has a predefined profile as viewed over the cross section of the honeycomb structure. If the honeycomb structure is, for example, formed of combinations with smooth and corrugated sheet-metal foils, and the structure is regular, then inner contact points between the two sheet-metal foils are formed at regular intervals along the profile direction of the layer. In this case, such a layer generally extends over a plurality of radial zones. Specifically taking this fact into consideration, it is proposed in this case that the density or number of connecting points which is generally possible with the provided contact points is increased.

In accordance with an added feature of the invention, it is also proposed that a different profile of the at least one at least partially structured metallic layer be provided in one radial zone than in at least one other radial zone. This means, for example, that a significant, clearly identifiable change in the profile direction takes place at the transition from one radial zone to another radial zone. In this case, this applies in particular for all of the layers which cross the zone boundary. Furthermore, the profile transition may also be non-continuous and/or result in a significantly different radius of curvature (if appropriate with a different orientation). The position of the inner contact points in relation to the overall cross section of the honeycomb structure is also influenced as a result of the change in the profile direction of the at least one at least partially structured metallic layer, in such a way that in this respective way, too, specifically in combination with other measures for providing different channel cross sections, it is possible to set a defined configuration of the inner contact points, through the use of which precise and durable brazing of the honeycomb body is made possible.

In accordance with an additional feature of the invention, it is considered to be advantageous that, in one radial zone, the channel cross section is influenced by projections which project into the channels. The projections are, for example, punched-out portions, bent portions or the like, through the use of which a part of the metallic layer is deformed so as to form projections (out of the normal structure). The projections may extend, for example, over at least a part of the channel cross section, and thereby likewise form inner contact points with the adjacent metallic layer, in such a way that additional contact points can be formed between the inner contact points with the "normal" structure. In this way, too, the density or number of inner contact points per unit of cross-sectional area or along the profile direction of the layers can be influenced.

In accordance with yet another feature of the invention, corresponding to one refinement of the honeycomb body, in one radial zone, the channel cross section is influenced due to a changed width or height of a structure of the at least partially structured metallic layer. It is very particularly preferable in this case for only the width or only the height of a structure to differ in the radial zones being considered. In this case, the "width" is to be understood to mean the spacing of similar structure extrema in the profile direction of the metallic layer, while the "height" indicates the spacing of opposite structure extrema transversely with respect to the profile direction of the metallic layer.

In accordance with yet a further feature of the invention, in one radial zone, the connecting points are formed with an extent in a circumferential direction of the honeycomb structure. The connecting points are generally provided so as to have a substantially linear or strip-shaped extent. The connecting points conventionally follow the profile of the structure or of the channels which extend between the end sides of the honeycomb structure. It is however now proposed in this case for one radial zone, that connecting points substantially perpendicular thereto be formed, which connecting points thus run parallel to the end sides or the cross section of the honeycomb structure. Under some circumstances, the connecting points may, for example, also be utilized to close off channels, wherein it is also preferable in this case for the channels to already have a channel cross-sectional shape which is unfavorable for the exhaust gas from a flow aspect. In this way, the pressure loss of an exhaust-gas flow flowing through such a honeycomb body can be kept low. From this aspect, too, it is advisable for connecting points with an extent in a circumferential direction of the honeycomb structure to be provided only in the edge region, that is to say close to the housing. In this case, the "extent" is the greatest dimension of the individual connecting points, that is to say, for example, the length dimension in the case of a strip-shaped or linear structure of the connecting point.

In accordance with yet an added feature of the invention, the honeycomb structure may be formed, in at least one radial zone, with a coating. The coating may, for example, be provided so as to prevent the formation of diffusion connections between those metallic layers which are in contact and between which no connecting points should be formed. A corresponding coating may include, for example, aluminum oxide. At the same time, it is also possible to alternatively and/or additionally provide a coating for exhaust-gas treatment, for example for converting constituents contained in the exhaust gas and/or for storing certain components of the exhaust-gas flow.

In accordance with yet an additional, very particularly preferable, feature of the invention, the honeycomb structure is formed with a multiplicity of at least partially structured metallic layers all of which bear with both ends against the housing and are connected thereto to a limited extent axially. In other words, this means, in particular, that each metallic layer divides the cross section of the honeycomb structure or spans the cross section. In order to realize a secure connection, which can at the same time be subjected to load, between the honeycomb structure and the housing, both ends serve for fixing the honeycomb structure to the housing, wherein the honeycomb structure is connected to the housing not over the entire axial extent but rather only in an axially limited section. The axially limited section amounts, for example, to less than 40%, in particular less than 20% of the axial length of the honeycomb structure. It is very particularly preferable for a honeycomb structure of this type having an S-shaped, V-shaped and/or O-shaped profile to be provided.

With the objects of the invention in view, there is concomitantly provided a motor vehicle, comprising an internal combustion engine and an exhaust-gas aftertreatment system. The exhaust-gas aftertreatment system has at least one honeycomb body according to the invention.

Other features which are considered as characteristic for the invention are set forth in the appended claims, noting that the features specified individually in the claims may be combined with one another in any desired technologically meaningful way and form further embodiments of the invention.

Although the invention is illustrated and described herein as embodied in a metallic honeycomb body with defined connecting points and a motor vehicle having the honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 4 is an enlarged, fragmentary, elevational view of an added embodiment of the honeycomb body;

FIG. 5 is an enlarged, fragmentary, elevational view of an additional embodiment of the honeycomb body;

FIG. 6 is a further enlarged, perspective view of a metallic layer for constructing a honeycomb structure of a further type;

DETAILED DESCRIPTION OF THE INVENTION

Figure 1:
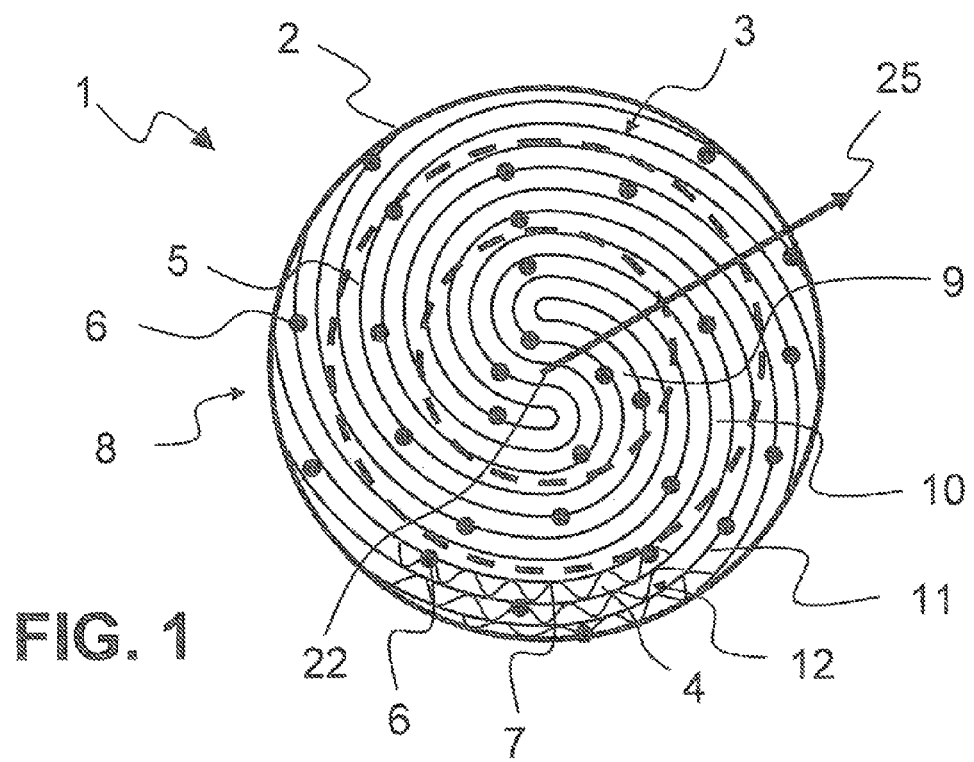
FIG. 1 is a diagrammatic, cross-sectional view showing an end of one embodiment of a honeycomb body according to the invention.

Referring now in detail to the figures of the drawings, in which identical elements are generally provided with the same reference numerals and which show particularly preferred embodiments to which the invention is not restricted, and first, particularly, to FIG. 1 thereof, there is seen an end-elevational view showing a cross section 8 of a honeycomb body 1. In this case, the honeycomb body 1 is formed with a round housing 2 in the manner of a casing tube in which a honeycomb structure 3 is positioned. The honeycomb structure is formed with a multiplicity of smooth and corrugated metallic layers 5, which in this case are disposed in an S-shape. The metallic layers 5 serve to form a multiplicity of channels 4 which arise, in particular, from a corrugated structure having a channel cross section 12 of the structured metallic layer 5. In this case, the channels 4, like the structure having the channel cross section 12, run substantially perpendicular to a radius 25 of the honeycomb body 1, that is to say in this respective case into the plane of the drawing.

The cross section 8 may now, for example, be divided, proceeding from its center in the region of the axis 22, into a plurality of radial zones, specifically a first radial zone 9, a second radial zone 10 and a third radial zone 11. In this case, the zones are formed in the manner of concentric circles or circular rings, although a structure differing therefrom is likewise possible. As is diagrammatically indicated therein in a part at the bottom, the zones include a plurality of the metallic layers 5 in the direction of the radius 25. The metallic layers 5 in one radial zone, such as in this case, for example, the third zone 11, form a row of contact points 7, which are formed, in particular, linearly along extrema, or peaks and valleys, of the structure having the channel cross section 12. As is indicated (purely diagrammatically) herein, only very few connecting points 6 are formed in a distributed manner, despite the provision of a considerably greater number of contact points 7. In the variant shown in FIG. 1, it is the case in all of the zones that at least 1% and at most 20% of the contact points 7 of the metallic layers 5 form a connecting point 6 with one another, although this is not imperatively necessary.

Figures 2, 3:
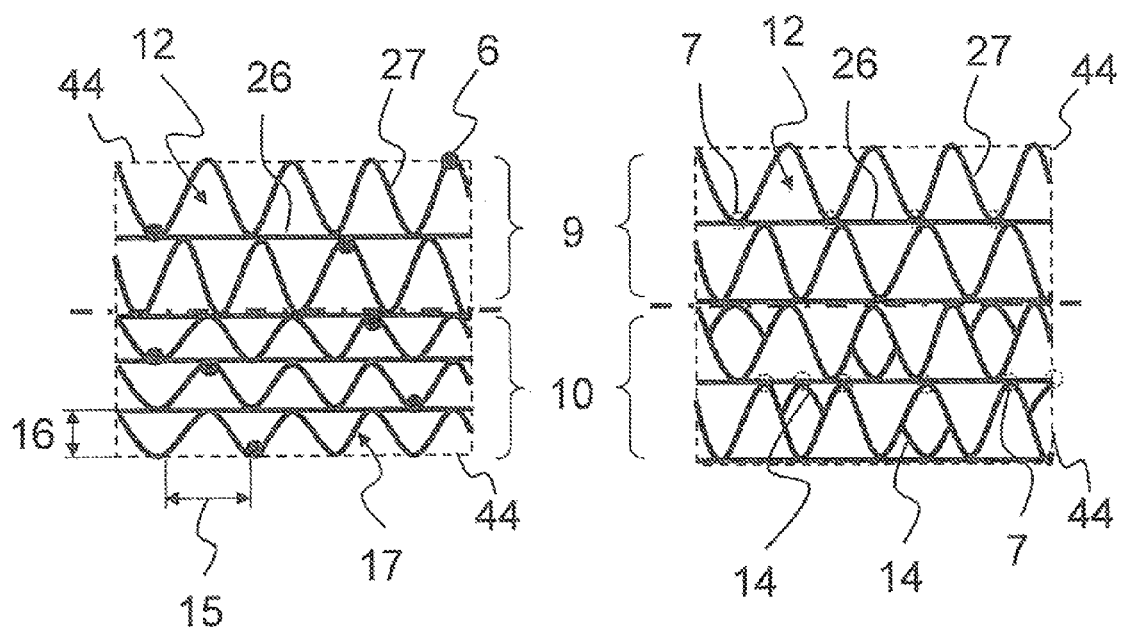
FIG. 2 is an enlarged, fragmentary, elevational view of a further embodiment of the honeycomb body.
FIG. 3 is an enlarged, fragmentary, elevational view of another embodiment of the honeycomb body.

FIG. 2 shows a portion of such a honeycomb structure 3 in cross section, with a transition from a first radial zone 9 to a second radial zone 10 being shown therein. In an upper region, the first radial zone 9 is formed with an alternating configuration of a corrugated layer 27 and a smooth layer 26. The two layers make contact with one another in a multiplicity of regions (contact points), with only some of them being used to form connecting points 6. A structure of the smooth layers and corrugated layers with a changed channel cross section 12 is shown below the first radial zone 9. The channel cross section 12 is delimited by the adjacent layers which make contact with one another. A channel is distinguished, in particular, by the respective layers and the two adjacent contact points. In a lower section of FIG. 2, a structure 17 is formed in such a way that, although it has the same width 15, it has a reduced height 16. This has the effect that a greater number of contact points or connecting points 6 is made possible or realized in a lower unit of cross-sectional area 44.

A corresponding illustration is also shown in FIG. 3. In this case, in the unit of cross-sectional area 44 of the second radial zone 10 illustrated at the bottom, the density or number of contact points 7 is increased by virtue of the corrugated layer 27 being formed (only in this case) at predefined points with projections 14 which form additional contact points 7. In that way, too, the number or density of the contact points 7 can be influenced.

FIG. 4 shows a further embodiment, following the same type of illustration. In this case, a different structure of the channel cross sections 12 is shown in the second radial zone 10 illustrated at the bottom. This is achieved in this case in that only smooth layers 26 are provided in that region. The smooth layers 26 are formed, for example, with embossings 28 which form a height to width ratio of the structure significantly different than that realized in the first radial zone 9. In particular, in that region, the smooth layers 26 are situated considerably closer together than in the configuration in the first radial zone 9.

In FIG. 5, the structure of the corrugated layer 27 has been maintained in the first radial zone 9 and the second radial zone 10. For that purpose, the smooth layer 26 has, however, been formed, in the region of the second radial zone 10, with a structure 17 which is matched to or nestles against the structure of the corrugated layer 27. In this way, the contact region between the two layers can be expanded, in such a way that in this way a targeted adaptation or realization of the connecting points is possible.

FIG. 6 shows a diagrammatic and perspective view of a partially structured metallic layer 5. In a left-hand region of FIG. 6, the metallic layer has a corrugated or sinusoidal structure 17 with elevations 29 and depressions 30 which extend perpendicular to the direction of a profile 13 of the layer 5 (or corrugated layer 27). The structure extrema (elevations and/or depressions) form contact points which can be used to realize connecting points or locations 6. Such a connecting point or location 6 is indicated in two partial regions, although the connecting points 6 are generally spaced further apart from one another in the direction of the profile 13. The connecting point or location 6 is nevertheless formed in this case with a strip-shaped or linear structure, in such a way that it has a (maximum) extent 18 along the structure extrema. In order to form the different radial zones later in the honeycomb body, that section of the layer 5 is adjoined by a substantially smooth section 31. Embossings 28 are nevertheless provided in the smooth section 31. The embossings 28 extend, in particular, perpendicular to the structure 17. With regard to their dimensions, too, the embossings 28 are considerably smaller, in particular the height is smaller, than 10% of the height of the structure 17. The embossings 28 may project toward one and/or both sides of the layer 5 and, in this respect, form linear contact points, which extend in the circumferential direction of the honeycomb body, with adjacent layers 5. If the contact points are to be used for fixing the layers, then the connecting point 6 is formed along the embossings 28, in such a way that they have a differently orientated (maximum) extent 18 (substantially in the direction of the circumference in the assembled state). A curved end 21, which is provided adjacent thereto at the right-hand side, forms the end of the layer 5 and serves, in particular, for making contact with a housing. The areal contact with the housing can be improved as a result of the curved structure.

Figure 7:
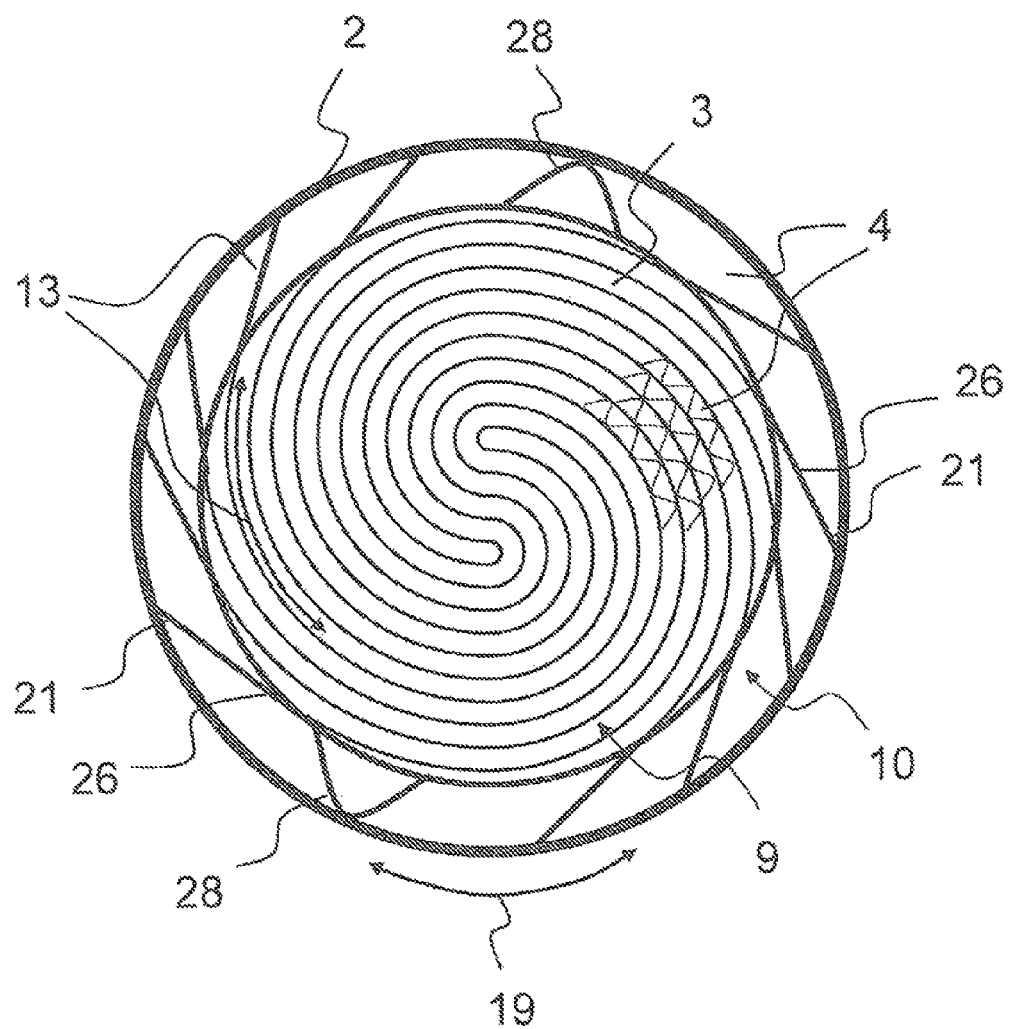
FIG. 7 is a cross-sectional view of an additional embodiment of the honeycomb body.

FIG. 7 diagrammatically shows an embodiment in which the honeycomb structure 3 is again formed with corrugated layers and smooth layers, but the corrugated layers are shortened. The smooth layers 26 merge, for example, from a curved profile into a rectilinear profile 13 and then make contact with the housing 2. In other words, this means that the first radial zone 9 provides channels 4 which have a relatively small channel cross section and which are formed by smooth layers and corrugated layers. In contrast, the outer, second radial zone 10 is formed only with smooth layers 26. In this case, the smooth layers 26 may also, in particular, have a strengthened structure. It is therefore possible, for example, for the smooth layer 26 to be deformed in the region of the second radial zone 10 in such a way that a multiple layer thickness is obtained there, for example, through the use of multiple folds of the smooth layers 26. It is likewise possible in this case for additional sheet-metal foils (for example with a different sheet-metal thickness) to be welded, brazed or fastened in some other way to the smooth layers 26 (note the thicker lines). It can also be seen in cross section that, due to the S-shaped configuration of the layers in the first radial zone 9, a non-uniform emergence of the smooth layers 26 in the direction of the housing 2 is realized. In order to nevertheless realize a uniform connection of the honeycomb structure 3 to the housing 2 in the circumferential direction 19 in this case, a part of the smooth layer 26 may be formed with additional embossings 28 in such a way that contact points or connecting points 6 are formed at substantially equal intervals in the circumferential direction 19.

Figure 8:
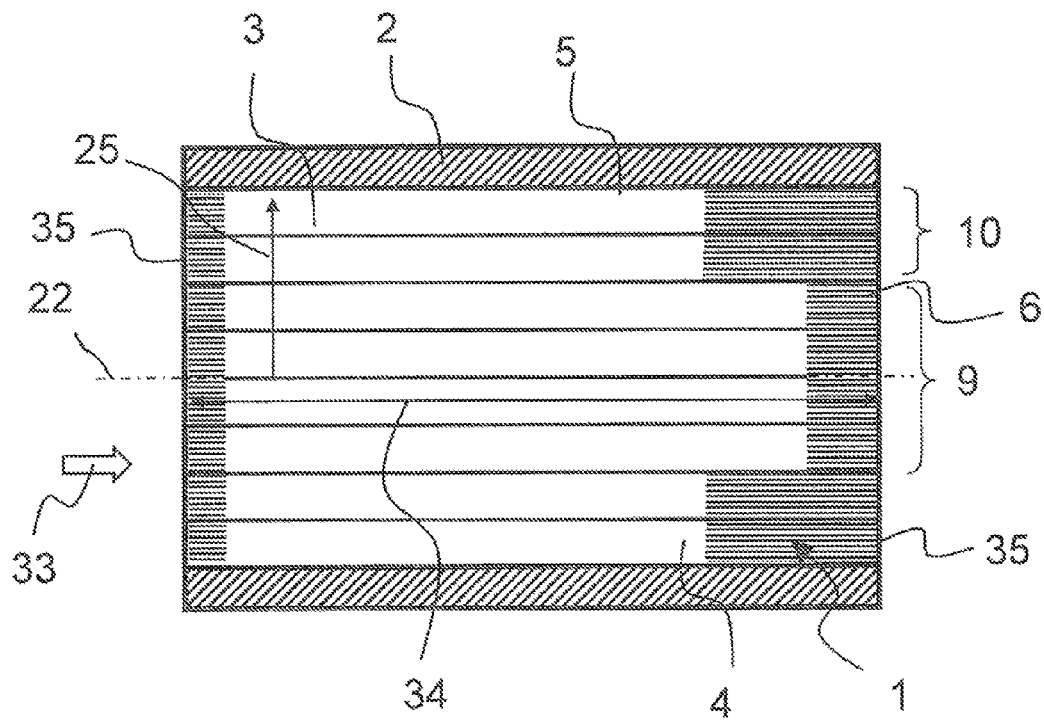
FIG. 8 is a longitudinal-sectional view of an embodiment of a honeycomb body.

FIG. 8 shows a longitudinal section through an embodiment of the honeycomb body 1. The honeycomb body 1 is again delimited at the outside by a housing 2 in which the honeycomb structure 3 is positioned. The honeycomb structure 3 has a multiplicity of channels 4 which extend between end sides 35 of the honeycomb structure 3. In this case, a length 34 of the honeycomb structure 3 is also defined by the end sides 35. In the embodiment shown therein, the direction of extent of the channels 4 is parallel to the central axis 22 of the honeycomb structure 3. The radius 25 is indicated perpendicular to the axis 22.

The position of the individual connecting points in relation to the axis 22, the end side 35 and/or the length 34 is clear from this longitudinal section. In the region or vicinity of the end side 35 impinged upon by exhaust gas in a flow direction 33, an adjoining connecting region is formed, in which the connecting points 6 are relatively short, for example less than 10 mm or even less than 5 mm. At the opposite end side 35, in the region or vicinity of the first zone 9 which is formed concentrically around the axis 22, a multiplicity of connecting points 6 is provided which have a different extent than the connecting points 6 in the second zone 10 in the form of a circular ring at the outside. For clarification, it is pointed out that no large-area connections are formed in this case. The hatching for the connecting points 6 is thus purely diagrammatic. Basically only distributed linear connecting points 6 are formed in this case at a predefined number of contact points of the adjacent metallic layers 5.

Figure 9:
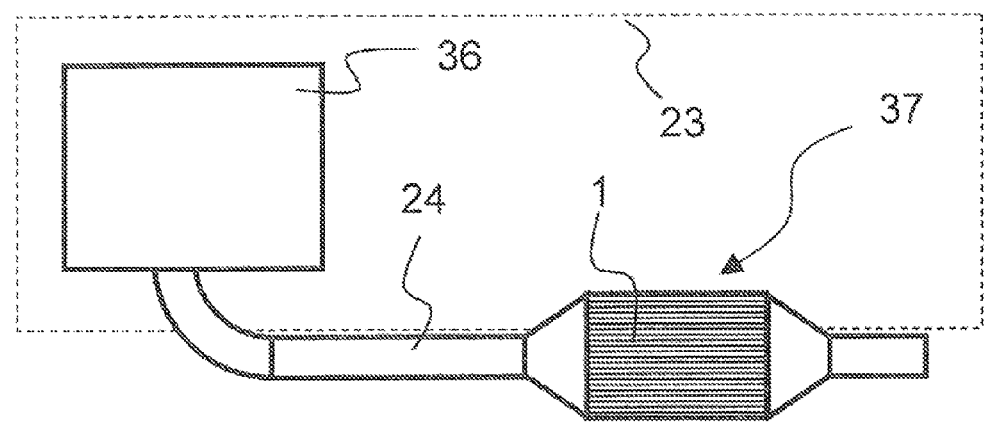
FIG. 9 is a plan view of a motor vehicle having an exhaust system.

FIG. 9 diagrammatically shows a motor vehicle 23 having an internal combustion engine 36, for example a diesel engine or a spark-ignition engine. Exhaust gas generated in the internal combustion engine 36 flows through an exhaust-gas aftertreatment system 24 to at least one exhaust-gas treatment unit 37. The exhaust-gas treatment unit 37 is formed in this case with the honeycomb body 1 according to the invention. In particular, consideration is given to catalytic converters, adsorbers, filters, particle separators, reformers, heaters or the like as the exhaust-gas treatment units 37.

Figure 10:
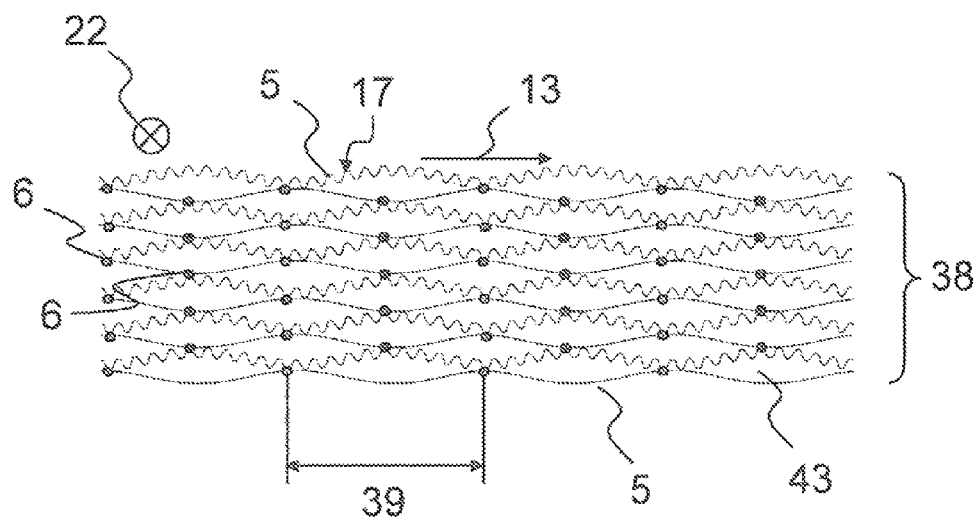
FIG. 10 is a fragmentary, elevational view of a first embodiment of a stack for a honeycomb body.

FIG. 10 shows a stack 38 having a multiplicity of structured and smooth metallic layers 5 (for example in the form of sheet-metal foils and/or metallic superfine-wire nonwovens). In this case, the stack 38 is illustrated in a still-unbound state, that is to say it has a substantially rectilinear profile 13. The connecting points 6 of the metallic layers to one another are also illustrated, with different coloring or shading. As a result of the fact that the formation of such connecting points 6 (brazed connections) first takes place in the assembled state, that is to say in the wound state, in the interior of the housing, FIG. 10 shows, in particular, the position for an adhesive agent on which, for example, powdered brazing material is positioned after the coiling process. The brazing material ultimately serves to generate top-side connecting points (marked in this case by dark points) and bottom-side connecting points (marked in this case by light points), which are illustrated herein by way of example and illustratively, in relation to the structured metallic layers 5. A printing process, for example in the form of an inkjet process, may be used, in particular, in order to position the adhesive agent and/or the brazing material.

It is shown at the bottom of FIG. 10 that the bottom-side connecting points 6 of the same type, that is to say in this case to the bottom smooth layer 5, form a predefined spacing 39 which, for example in the direction of the profile 13, amounts to at least 20 mm and/or encompasses a multiplicity of structure extrema (elevations and depressions, for example at least 20 elevations). Even though a regular configuration of the connecting points 6 is shown in this case, this is not imperatively necessary. Conventionally, the structure 17 of a corrugated metallic layer 5 in each case bears against the smooth metallic layer 5, in such a way that the structure 17 forms contact lines or contact points on the smooth layer 5 in the direction of the axis 22, that is to say perpendicularly to the profile 13. The illustration in FIG. 10 is intended to show that, in the event of a force acting on the metallic layers 5 perpendicular to the profile 13 during later operation, expansion joints 43 can be formed which thereby permit a considerably more flexible honeycomb structure and a better adaptation to the thermal and dynamic loading characteristics of the honeycomb structure.

Figure 11:
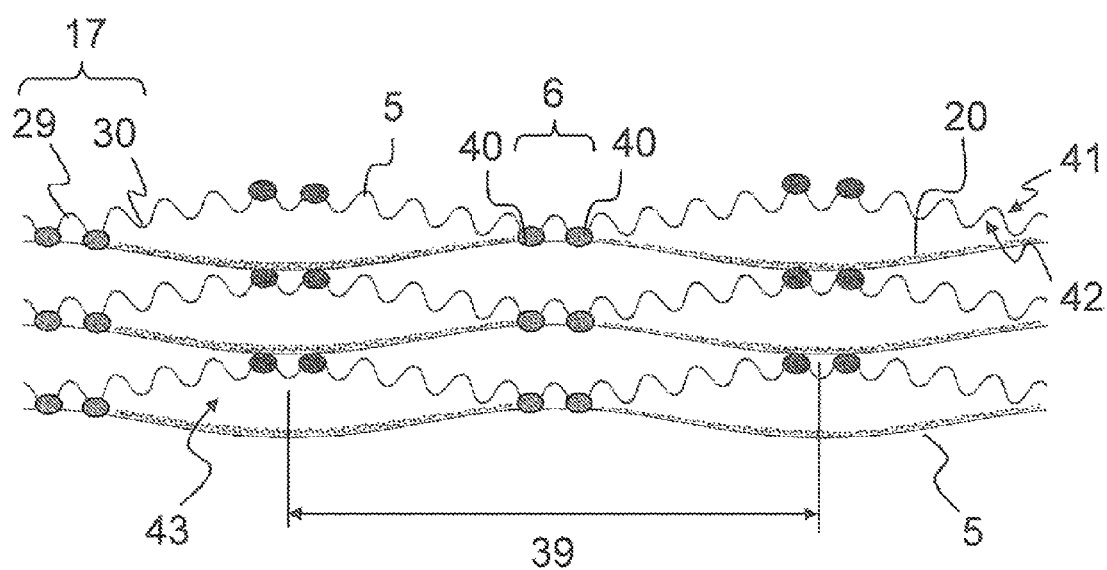
FIG. 11 is an enlarged, fragmentary, elevational view of a second embodiment of a stack for a honeycomb body.

FIG. 11 shows a variant in which each connecting point 6 is formed with two brazing points 40 on adjacent structure extrema (elevations 29 or depressions 30). A multiplicity of structure extrema of the structured metallic layer 5 is provided between the connecting points 6. It is pointed out at this juncture that the number of structure extrema between the identical connecting points 6 (connecting points illustrated in the same color or shading) in the direction of the profile 13 is normally considerably higher than that which is illustrated in this case by way of example. In particular, at least fifteen (15) structure extrema are situated in between.

Furthermore, it can be seen from FIG. 11 that the smooth metallic layers 5 may be provided with a coating 20 which, in particular, prevents (undesired) diffusion connection of the adjacent metallic layers 5 which regularly bear against one another during use. Even though the coating is preferably provided on a top side 41 and a bottom side 42 of the smooth and/or corrugated metallic layer 5, the provision, for example, of an oxide layer on one side may suffice in exceptional situations. At any rate, it should be ensured in this way that a connection of the metallic layers, for example as a result of diffusion, is prevented, and relatively large expansion joints 43 can consequently form under loading. In other words, it is possible as a construction rule to specify that such an expansion joint 43 is formed, for example, with a section of a smooth metallic layer 5 and a section of a structured metallic layer 5, with the expansion joint 43 being delimited by two identical connecting points (shown in this case for bottom-side connecting points), and furthermore with the expansion joint delimitation through the use of the structured metallic layer 5 being formed with at least fifteen (15) structure extrema. This provides a particularly high degree of deformability of the expansion joint 37 or a flexible configuration of the adjacent sheet-metal foils, specifically both in the direction of the profile 13 and also perpendicular thereto. The number of brazing points per connecting point 6 is limited to a maximum of three, in particular, even to only two, and the embodiment of a connecting point 6 with precisely only one brazing point is particularly preferable.

The invention claimed is:

1. A honeycomb body, comprising:
a housing having a longitudinal axis and an inside diameter;
a honeycomb structure disposed in said housing and having a cross section across said longitudinal axis with radial zones and at least one at least partially structured metallic layer having two terminal ends, both of said terminal ends bearing against said inside diameter of said housing;
said at least one at least partially structured metallic layer having inner contact points and defining a multiplicity of channels;
at least 1% and at most 20% of said inner contact points in said cross section in at least one of said radial zones forming a respective connecting point fixing said honeycomb structure, said connecting points having a density, as viewed along said at least one at least partially structured metallic layer, being higher in one of said radial zones than in at least one other of said radial zones; and
said channels having different channel cross sections in at least two of said radial zones.

2. The honeycomb body according to claim 1, wherein said inner contact points have a higher density per unit of cross-sectional area of said honeycomb structure in one of said radial zones than in at least one other of said radial zones.

3. The honeycomb body according to claim 1, wherein said at least one at least partially structured metallic layer has a different profile in one of said radial zones than in at least one other of said radial zones.

4. The honeycomb body according to claim 1, which further comprises projections projecting into said channels in one of said radial zones and influencing a cross section of said channels.

5. The honeycomb body according to claim 1, wherein said at least one at least partially structured metallic layer has a structure with a different width or height in one of said radial zones influencing a cross section of said channels.

6. The honeycomb body according to claim 1, wherein said connecting points are formed with an extent in a circumferential direction of said honeycomb structure in one of said radial zones.

7. The honeycomb body according to claim 1, wherein said honeycomb structure is formed with a coating in at least one of said radial zones.

8. The honeycomb body according to claim 1, wherein said at least one at least partially structured metallic layer includes a multiplicity of at least partially structured metallic layers, both of said ends of all of said multiplicity of at least partially structured metallic layers bearing against said housing and being connected to said housing to a limited extent axially.

9. A motor vehicle, comprising:
an internal combustion engine; and
an exhaust-gas aftertreatment system, said exhaust-gas aftertreatment system having at least one honeycomb body according to claim 1.

10. The honeycomb body according to claim 1, wherein said at least one at least partially structured metallic layer has a profile being one of an S-shape, V-shape, W-shape, or U-shape.

11. A honeycomb body, comprising:
a housing having an inside diameter;
a honeycomb structure disposed in said housing and having a cross section with radial zones and at least one at least partially structured metallic layer, said at least one at least partially structured metallic layer passing between at least two of said radial zones and having two terminal ends, both of said terminal ends bearing against said inside diameter of said housing;
said at least one at least partially structured metallic layer having inner contact points and defining a multiplicity of channels;
at least 1% and at most 20% of said inner contact points in said cross section in at least one of said radial zones forming a respective connecting point fixing said honeycomb structure, said connecting points having a density, as viewed along said at least one at least partially structured metallic layer, being higher in one of said radial zones than in at least one other of said radial zones; and
said channels having different channel cross sections in at least two of said radial zones.

12. The honeycomb body according to claim 11, wherein said at least one at least partially structured metallic layer has a profile being one of an S-shape, V-shape, W-shape, or U-shape.

* * * * *